United States Patent [19]

Ugo

[11] 4,095,374
[45] Jun. 20, 1978

[54] METHOD AND APPARATUS FOR IMPROVED TIRE UNIFORMITY GRINDING AND MEASURING

[75] Inventor: John W. Ugo, Warren, Mich.
[73] Assignee: Uniroyal, Inc., New York, N.Y.
[21] Appl. No.: 811,120
[22] Filed: Jun. 29, 1977
[51] Int. Cl.² ............................................ B24B 49/16
[52] U.S. Cl. .............................. 51/165 R; 51/281 R; 51/DIG. 33; 73/146
[58] Field of Search ......... 51/165 R, 281 R, DIG. 33, 51/106 R; 73/146

[56] References Cited

U.S. PATENT DOCUMENTS

3,739,533   6/1973   Iida ..................................... 51/165 R
3,948,004   4/1976   Gruber ............................... 51/165 R Primary Examiner—Harold D. Whitehead
Attorney, Agent, or Firm—Jeffrey M. Grenman

[57] ABSTRACT

A method and apparatus for determining the conicity of a tire wherein, while the tire is being corrected for radial force variation by grinding as it revolves in a first direction, the lateral thrust force of the lateral force variation is determined and stored. The tire is revolved in a second direction and the lateral thrust force is determined. The conicity of the tire is calculated by use of the post grinding lateral thrust force values and then is compared to a predetermined maximum allowable conicity. The tire is graded accordingly. Associated circuity and apparatus are disclosed.

8 Claims, 8 Drawing Figures

METHOD AND APPARATUS FOR IMPROVED TIRE UNIFORMITY GRINDING AND MEASURING

BACKGROUND OF THE INVENTION

1. Field of the Invention

This invention relates to a method and apparatus for determining tire uniformity. More specifically, after grinding the tire to reduce correctable radial force variation, the post grinding lateral thrust force values are used to calculate the conicity of the tire.

2. Prior Art

Various constructions of pneumatic vehicle tires are well known. Ideally, these well known constructions will yield tires that are quite uniform. It is acknowledged, however, that at the present state of the art, the technology of pneumatic tire manufacturing is incapable of producing a pneumatic tire that is completely uniform. The variations which can occur in both materials and the assembly of materials during the manufacturing process giving rise to such non-uniformity are well known and need not be detailed herein.

Experience has shown that minor deviations from uniformity can be tolerated and do not contribute, to any significant degree, to an objectionable level of non-uniformity such as would adversely affect the ride quality of the tire. However, when deviations exceed certain levels, they will have an adverse affect on the ride and handling characteristics of the vehicle on which they are mounted.

One source of tire non-uniformity is the variation in the forces which are exterted radially, i.e., parallel to the wheel plane direction between the tire and the road surface as the tire rolls along such surface under normal load. This force variation is referred to hereinbelow as radial force variation. Another source of tire nonuniformity is the variation in the forces which are exerted laterally, i.e., perpendicular to the wheel plane direction between the tire and the road surface and this force is referred to hereinbelow as the lateral force variation.

The lateral force variation and the radial force variation each usually have a random wave form which, while it may vary from tire to tire, has a repetitive variation with a period corresponding to one rotation of the tire.

It has been observed that the lateral force exerted on the road surface as the tire is revolved in a clockwise direction is usually different from the lateral force exerted on the road surface when the tire is revolved in a counterclockwise direction. This difference in the lateral force exerted by the tire is due to the fact that there are certain characteristics in the tire which can result in a lateral force or thrust being exerted by the tire which force is dependent upon the direction of rotation. As used hereinbelow, the term lateral thrust will denote the lateral force in a given direction. The average, or net lateral force is sometimes referred to as conicity and is equal to the sum of the lateral thrust forces measured as the tire revolves in the clockwise and counterclockwise directions divided by two.

The conicity effect occurs when forces developed in the revolving tire tend to continuously alter the path of movement of the tire either to the left or to the right of a desired path or movement regardless of the direction of rotation of the tire.

Further, there are other factors present in a tire which can cause a variation in the lateral force exerted by a tire on its supporting surface which factors are substantially unaffected by the direction of rotation.

In order to ensure a high directional stability of vehicles, it has been found necessary to keep the lateral force variation to a minimum by improving the accuracy in each manufacturing process for eliminating the non-uniformity. Moreover, it has been proposed that the conicity can be reduced by grinding one axially outer rib completely around the tire. It has also been proposed that such process can be practiced by grinding one axially outer rib entirely circumferentially about the tire to a greater extent than the other axially outer rib is ground. This procedure is detailed more fully in U.S. Pat. No. 3,739,533. A further procedure for correcting the conicity of a tire is disclosed in U.S. Pat. No. 3,946,527 in which the axially outer ribs are ground at selective points.

While it has been recognized that the conicity of a tire can be altered or reduced by grinding the axially outer ribs of the tire in accordance with the procedures set forth in the abovenoted patents, the effect that grinding a tire to reduce correctable radial force variation has on conicity has heretofore gone ignored. It has long been the practice to minimize the magnitude of the radial force variation by grinding the shoulder areas at the points which generate a high radial force variation as measured by a uniformity tester. Briefly, such a method of reducing correctable radial force variation involves the steps of (a) revolving the tire under a load in a first direction and concurrently determining the radial composite and harmonic force values and comparing the values against pre-selected lower and upper limits; (b) revolving the tire under a load in a second direction and concurrently determining the radial composite and harmonic force values and comparsing the values against pre-selected lower and upper limits; and (c) grinding the tire while it is revolving in the second direction in accordance with the radial composite force value so as to reduce correctable radial force variation. During steps (a) and (b), the lateral force variations are usually measured as the tire revolves in the first and the second directions to determine the lateral thrust force values from which the conicity is determined and the final classification of the tire.

The drawback in the procedure is that the lateral thrust which was measured as the tire revolves in the first direction prior to the removal of material in the grinding step during which the tire revolves in the second direction, may have changed because of the removal of material from the tire. Therefore a conicity value calculated by using the lateral thrust force value which has been changed by grinding and which has not been updated is inaccurate.

It is towards the elimination of this and other drawbacks in the prior art that the present invention is directed.

SUMMARY OF THE INVENTION

1. Purposes of the Invention

It is an object of the present invention to provide a method for calculating the conicity of a tire which accounts for the changes in the lateral thrust force values caused by grinding the tire to reduce correctable radial force variation.

Another object of the present invention is to provide a method for calculating the conicity of a tire which can be practiced on existing tire uniformity machines.

Yet another object of the present invention is to provide a method of determining tire uniformity which results in a more accurate determination of the force characteristics of the tire.

Still another object of the present invention is to provide an apparatus for calculating the conicity of a tire which accounts for the changes in the lateral thrust force values caused by grinding the tire to reduce correctable radial force variation.

A further object of the present invention is to provide an apparatus for determining tire uniformity which results in a more accurate determination of the force characteristics of the tire.

Other objects and advantages of the present invention in part will be obvious and in part will become apparent as the description proceeds.

2. Brief Description of the Invention

Briefly stated, and in accordance with one embodiment of the present invention, a preferred method of calculating the conicity of a rolling tire includes the steps of: (1) revolving the tire in a first direction under a load and concurrently measuring the radial and lateral force variations; (2) resolving the radial force variation into a radial composite force value and a radial harmonic force value; (3) resolving the lateral force variation into a lateral composite force value, a lateral harmonic force value and a lateral thrust force value; (4) comparing the radial composite force value, the radial harmonic force value, the lateral composite force value, and the lateral harmonic force value against pre-selected lower and upper limits; (5) grinding the tire as it continues to revolve in the first direction in accordance with the radial composite force value to minimize the radial force variation; (6) updating the lateral composite force value, the lateral harmonic force value and the lateral thrust force value during grinding and storing at least the lateral thrust force value; (7) revolving the tire in a second direction and measuring the radial and lateral force variations; (8) resolving the radial force variation into a radial composite force value and a radial harmonic force value; (9) resolving the lateral force variation into a lateral composite force value, a lateral harmonic force value and a lateral thrust force value; (10) comparing the radial composite, radial harmonic, lateral composite and lateral harmonic force values to pre-selected lower and upper limits; and (11) calculating the conicity of the tire using the post grinding lateral thrust force values.

A preferred apparatus in accordance with the present invention includes load cell means for sensing the variations in the radial force and lateral force exerted on a surface as a tire revolves in a first direction under a load. Means are provided for resolving the radial force variation into a radial composite force value and a radial harmonic force value. Means are also provided for resolving the lateral force variation into a lateral composite force value, a lateral harmonic force value and a lateral thrust force value. Comparator means compare the radial composite, radial harmonic, lateral composite and lateral harmonic force values to pre-selected lower and upper limits. Grind control means is provided to control corrective grinding of the tire in accordance with the value of the radial composite force value. Storage means are provided for retaining the updated value of the lateral thrust force. Upon completion of grinding, the tire is revolved in a second direction and the load cells detect the radial and lateral force variation generated. Means resolve the radial force variation into the radial composite and radial harmonic force values and resolve the lateral force variation into the lateral composite, lateral harmonic and lateral thrust force values. Comparator means compare the radial composite, radial harmonic, lateral composite and lateral harmonic force values against pre-selected lower and upper limits. A conicity calculator means determines the conicity by using the post grinding values of the lateral thrust force. A comparator means compares the conicity value against a pre-selected value for final tire classification.

The invention consists in the features of construction arrangement of parts and sequences of operation which will be detailed hereinafter and described in the appended claims.

BRIEF DESCRIPTION OF THE DRAWINGS

While the specification with claims particularly pointing out and distinctly claiming the subject matter regarded as the invention herein, it is believed that the invention will be better understood from the following description taken in conjunction with the accompanying drawings in which:

DETAILED DESCRIPTION OF THE PREFERRED EMBODIMENTS

Figure 1:
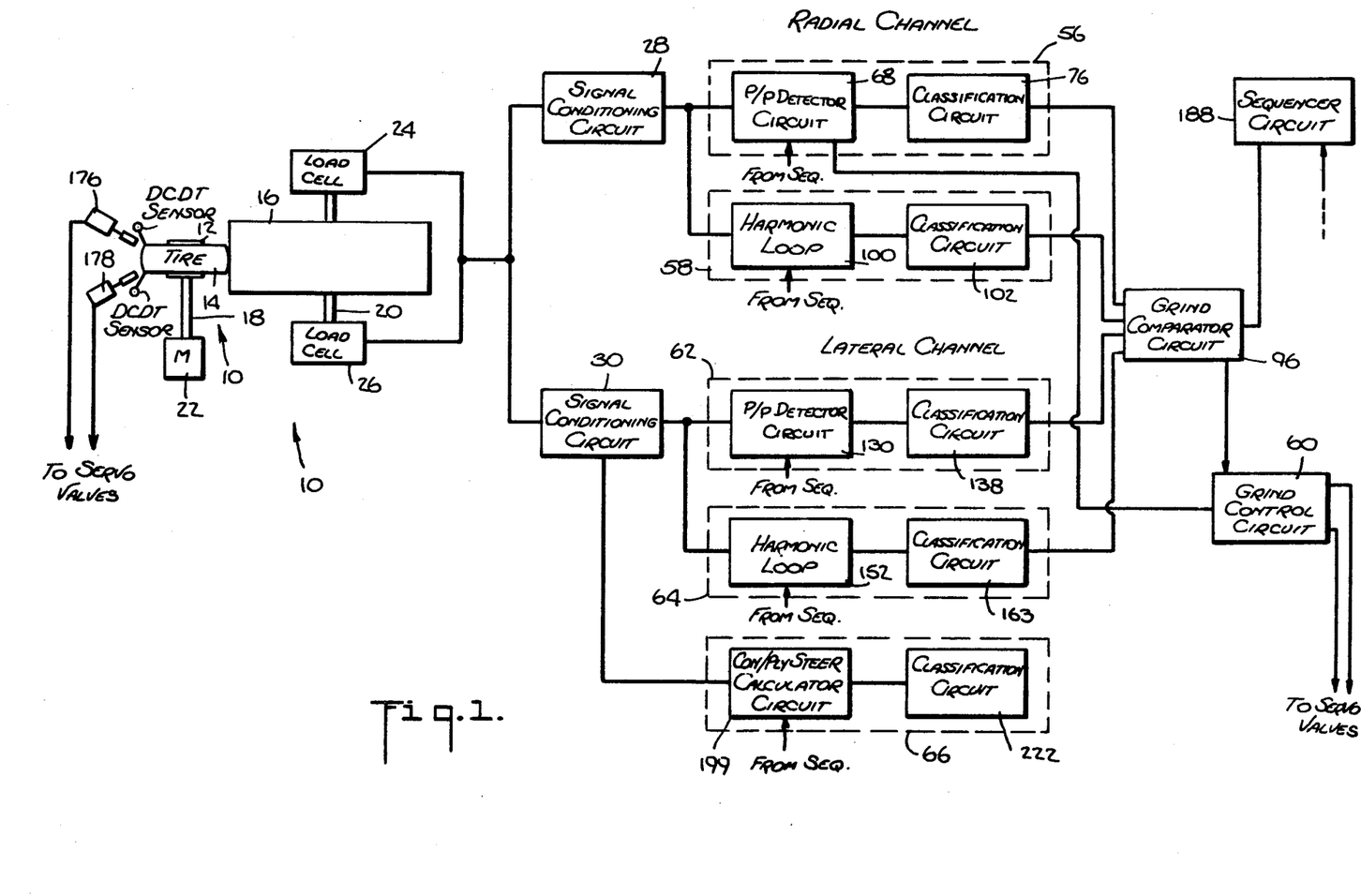
FIG. 1 is a schematic block diagram of a preferred embodiment of the present invention applied to a tire grinder control arrangement.

With reference to the drawings and in particular FIG. 1, there is illustrated a pneumatic tire or tire being tested on a force variation measuring and grinding machine or tire uniformity optimizer 10 only a part of which is illustrated schematically. While the force variation measuring machine illustrated is of an axis vertical type in which the tire is rotated in a horizontal plane with its axis of rotation extending in a vertical direction, it is to be understood that for the purposes of this invention the specific construction of the force variation measuring machine is deemed immaterial to the present invention and an axis horizontal machine can be utilized in the practice of the present invention without detracting in any manner therefrom.

Since force variation machines and tire grinding machines as well as control equipment for operating these machines are known to those skilled in the art, for the sake of brevity a detailed description of the complete force variation measuring and grinding apparatus and its control system will not be presented. A detailed description of portions of the apparatus and control system will be given wherever it is deemed necessary to best describe the present invention. Many of the components utilized in the control circuitry described hereinbelow are available on tire uniformity optimizer computers model no. - 0.45.0152-0 and model no. - 0.45.0152-1 manufactured by Electronic Associates, Inc., with headquarters at West Long Branch, New Jersey. The control circuitry is described and schematically illustrated in a publication entitled Electronic Associates, Inc. Tire Uniformity Optimizer Computer Manual for Model No. 0.45.0152 Industrial Series, dated 1972 (hereinafter referred to as Manual). Appropriate references will be made to the locations in the Manual at which a detailed description of the component under discussion may be found.

With continued reference to FIG. 1, the force variation measuring the grinding machine 10 is provided with a rim 12 of a precise dimension on which a tire 14 to be tested can be mounted and then inflated to its rated internal pressure. A load wheel 16 is adapted to be urged by a power source (not shown) against the tire 14 by regulating the distance between the tire axle 18 and the load wheel shaft 20 in order to apply a predetermined load on the tire. The tire 14 can be rotated or revolved selectively in either a clockwise or counterclockwise direction by a drive means 22 acting on the tire axle 18.

Non-uniformities inherent in the tire 14 cause variations in the forces being transmitted to the load wheel 16 by the tire 14 as it revolves. These forces tend to shift the load wheel in the corresponding direction i.e., a radial force variation will tend to shift the load wheel radially with respect to the axis of rotation of the tire and a lateral force variation will tend to shift the load wheel vertically, either upwardly or downwardly, as viewed in FIG. 1. Load cell means 24 and 26 sense the variations in the radial force exerted on the load wheel 16 and produce electrical signals referred to herein as a radial composite signal which are an analog of the radial force variation. Similarly, the load cell means 24 and 26 sense variations in the lateral force exerted on the load wheel and produce electric signals referred to herein as a lateral composite signal which are an analog of the lateral force variation.

In the description which follows, the term radial channel will be used as a preface when referring to the circuitry operating on the radial force variation signal to distinguish it from the circuitry acting on the lateral force variation signal, which will be prefaced by the term lateral channel.

The radial force variation signal and the lateral force variation signal are fed through signal conditioning circuits 28 and 30. The primary function of each of these circuits is to scale, properly, the input levels of the respective load signals and, via filtering, eliminate unwanted noise variations. Both of the signal conditioning circuits are discussed on page 3-4 of the Manual and are detailed schematically on Sheet 2 of Drawing DOO 045 0152 OS appearing therein.

Figure 2:
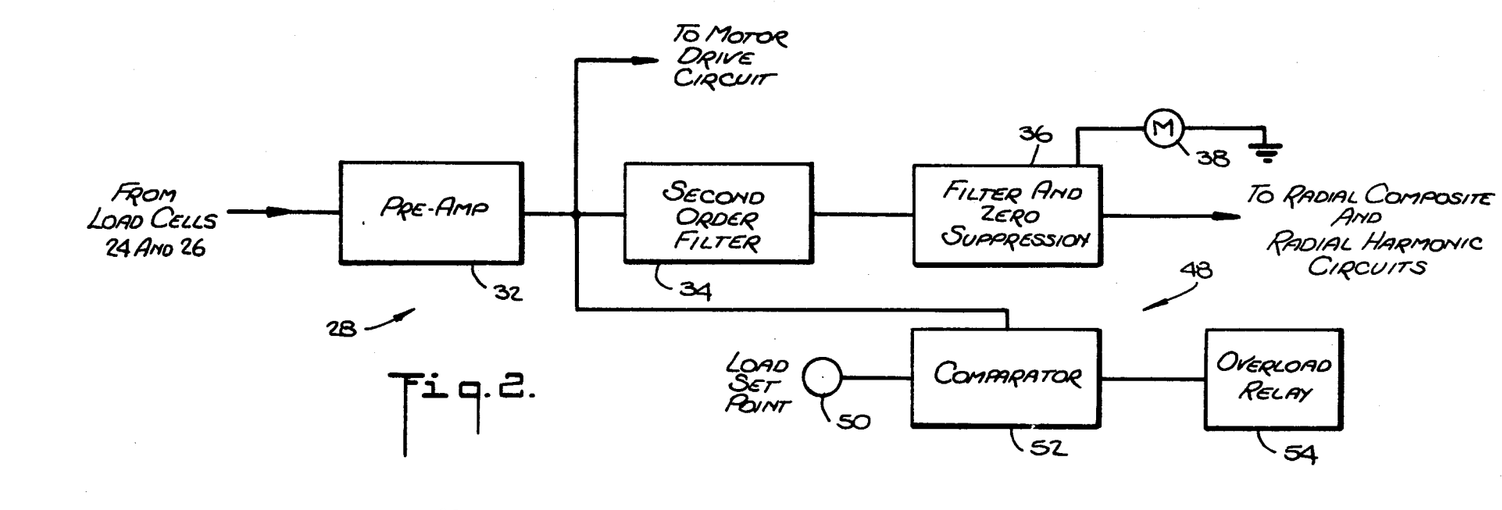
FIG. 2 is an amplified block diagram of the radial channel signal conditioning circuit 28 of FIG. 1.

Referring to FIG. 2, in the radial channel signal conditioning circuit 28 signals from the load cell means 24 and 26 pass through a pre-amplifier 32 which scales the load cell output signal to a level in which it can be used in the circuit. For example, the pre-amplifier 32 may have a gain of 333.3 to provide a 10-volt output for a 2,000 pound radial channel input. The pre-amplifier 32 is of the differential type wherein the amplifier output is the amplified difference between two inputs.

The output of the pre-amplifier 32 is fed to a second order filter circuit 34 to eliminate the effects of mechanical resonance which might otherwise appear as valid input signals. The output is also sent to the loadwheel drive circuit (not shown herein but which is discussed at pages 3-1 to 3-4 of the Manual and which is schematically detailed on Sheet 7 of Drawing DOO 045 0152 OS)

The output of the second order filter circuit 34 is applied to a filter and zero suppression circuit 36. At this point some further filtering is provided but the primary purpose is the zero suppression function which operates during load for warm-up and test to eliminate from the radial channel signal the component due to the loading on the tire. A tire load meter 38 may be provided to indicate, visually, the value of the tire load.

Figure 3:
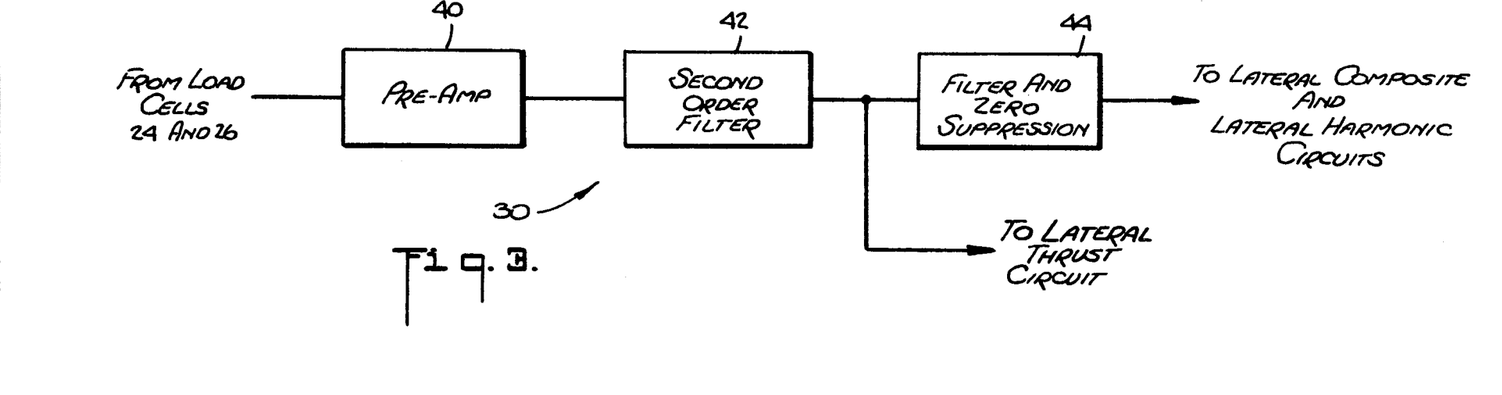
FIG. 3 is an amplified block diagram of the lateral channel signal conditioning circuit 30 of FIG. 1.

The signal conditioning circuit 30 for the lateral channel is similar to that for the radial channel and contains a pre-amplifier 40 which receives the lateral force variation signal from the load cell means 24 and 26. The pre-amplifier 40 may have a gain of 1,000 to provide a 3 volt output for a 100 pound lateral channel input. The circuit also contains a second order filter 42 and a filter and zero suppression circuit 44, both of which function in manners similar to their counterparts in the radial channel signal conditioning circuit.

An overload circuit 48 may be provided in the radial channel. This circuit includes a potentiometer 50 which is pre-set at a voltage corresponding to the desired maximum radial load. A comparator 52 compares the output signal of the pre-amplifier 32 to the potentiometer setting, and if the output signal exceeds the magnitude of the setting by a pre-set value, a relay 54 will be deenergized to interrupt a control circuit (not shown) in the force variation measuring and grinding machine 10 to indicate an overload condition.

The output of the radial channel signal conditioning circuit 28 is applied to radial composite, radial harmonic and grind control circuits identified by reference numerals 56, 58 and 60 respectively in FIG. 1. The output of the lateral channel conditioning circuit 30 is applied to a lateral composite circuit 62 and a lateral harmonic circuit 64. Further, the output of the second order filter 42 is applied to a lateral thrust circuit 66. All of these circuits will be described hereinbelow.

Figure 4:
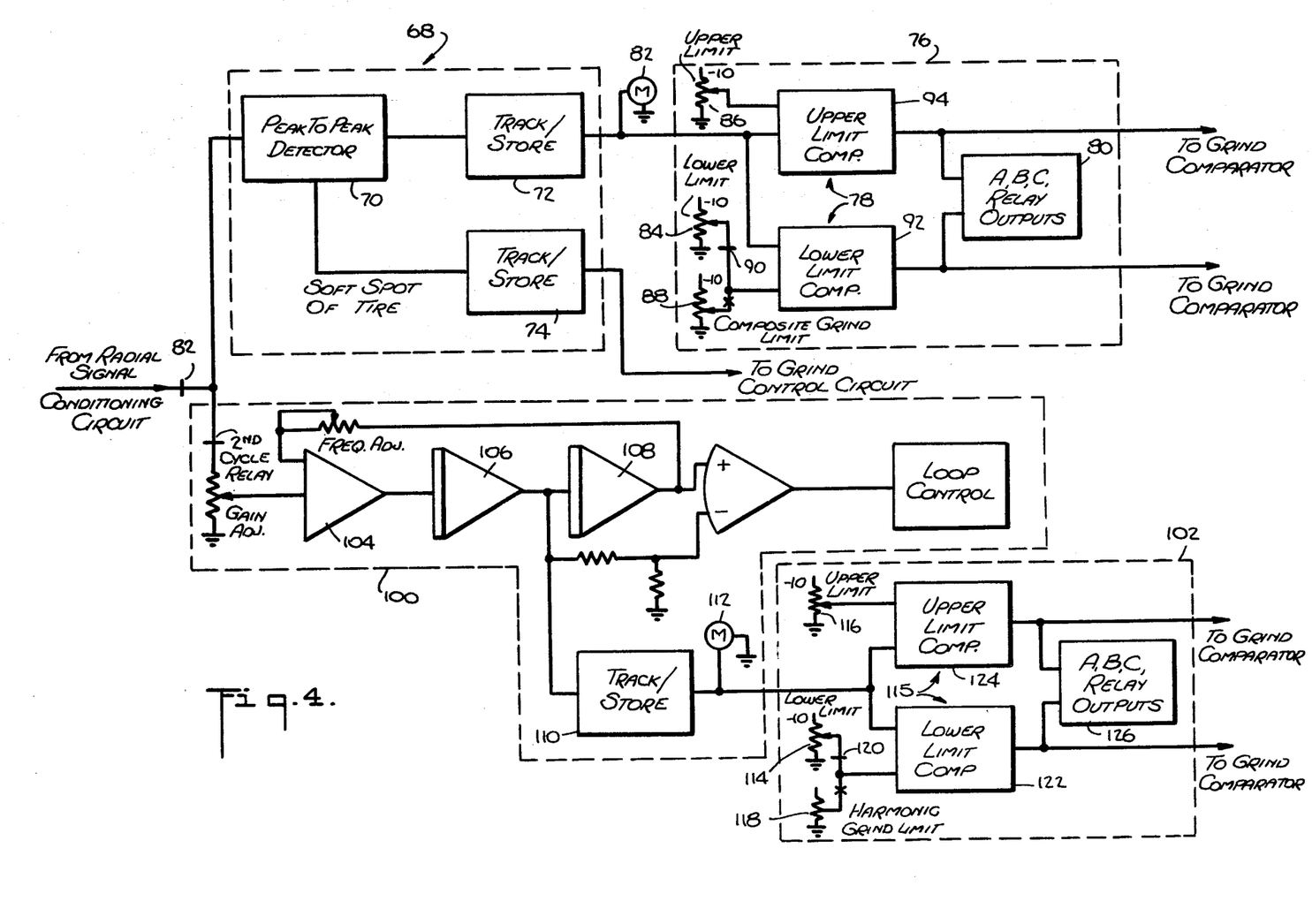
FIG. 4 is an amplified block diagram of the radial composite and radial harmonic circuits 56 and 58 of FIG. 1.

The radial channel composite circuit 56 as best seen in FIG. 4, includes a peak to peak detection circuit 68 having a peak to peak detector 70, and track and store circuits 72 and 74 associated therewith. Also included in the radial channel composite circuit 56 is a classification circuit 76 which includes a comparator circuit 78 and classification or grading relay circuit 80.

The output of the radial channel conditioning circuit 28 is applied through a relay switch 82 to the peak to peak detector 70 wherein the absolute value or peak to peak value difference of the signal is determined. The details of the peak to peak detector 70 will not be described herein since it is well known in the art. For a detailed discussion of this detector, reference should be had to pages 3-4 and 3-6 of the Manual and Sheet 3 of Drawing DOO 045 0152 OS therein. The output signal from the peak to peak detector 70 is fed to the track and store circuits 72 and 74. The signal sent to track and store circuit 72 is used in determining the classification of the tire and the signal sent to track and store circuit 74 is fed to the grind control circuit 60 to control the grinding process. Both of these track and store means are used to update values of the radial composite force signal during grinding as will be described. The value of the signal stored in the track and store means 72 may be visually displayed on a meter 82. The signal is also fed to comparator circuit 78 which includes three potentiometers 84, 86 and 88. An acceptable lower limit of the value of the radial composite force is programmed into the system by the setting of the potentiometer 84. Similarly, another value representative of the maximum value of the force beyond which a tire exhibiting such a value may not be ground is programmed into the system through the setting of potentiometer 86. The third potentiometer 88 is set to program into the system the value of the radial composite force to be achieved through grinding, which may or may not be equal to the setting of potentiometer 84. The relay 90 operates during the corrective grinding process to substitute the potentiometer 88 for the potentiometer 86 in the circuit. The actual value of the radial composite force is then compared with the signals corresponding to the setting of potentiometers 84 and 86 by means of lower and upper limit comparator circuits 92 and 94.

The following are the possible combinations of conditions and indications. The absolute value of the radial composite force signal may be les than the pre-set acceptable lower limit, in which case, the tire is given a level A classification. The absolute value of the radial composite force signal may be greater than the pre-set acceptable lower limit, but less than the acceptable upper limit, in which case, a level B classification is indicated. Finally, the absolute value of the radial composite force signal may be greater than the acceptable upper limit, in which case a level C classification is indicated. The ramifications of the level A, B and C classifications will be explained in detail below. For a detailed discussion of the classification circuit 76, reference should be had to page 3-7 and Sheet 3 of Drawing DOO 045 0152 OS appearing therein.

The outputs of the comparator circuits 92 and 94 are utilized to drive a grading relay circuit 80 which operates various marking devices to mark the tire, preferably in a coded designation, indicative of the value of the radial composite force and/or the classification level as determined above. Such marking can be carried out by any known means, so that no marking means is illustrated in the drawings. For a description of a typical grading relay circuit, reference should be had to page 3-7 of the Manual and Sheet 3 of Drawing DOO 045 0152 OS.

The outputs of the lower limit and upper limit comparator circuits 92 and 94 are also fed to a grind comparator circuit 96, which operates, as will be described hereinafter to control the corrective grinding process.

The radial channel harmonic circuit 58 also shown in FIG. 4 includes a harmonic loop arrangement 100 and a classification circuit 102. The harmonic loop arrangement is described thoroughly in the Manual at pages 3-6 and 3-7 and is schematically illustrated on Sheet 4 of Drawing DOO 045 0152 OS. A discussion of the classification circuit 102 which is similar to classification circuit 76, can be found in the Manual at pages where the latter is discussed.

The purpose of the harmonic loop 100 is to compute the peak to peak value of the fundamental harmonic component of the radial force variation wave form and to generate an output which is an analog signal proportional to the fundamental harmonic. It will be appreciated by those skilled in the art that any harmonic component other than the fundamental harmonic can be calculated with use of appropriate known circuitry.

The harmonic loop 100 includes an amplifier 104 and two integrators 106 and 108. The output of integrator 106 is fed to a track and store circuit 110 and the value of the signal may be indicated on a meter 112. Just as in the case of the radial composite force signal, an acceptable lower limit of the first harmonic is programmed into the system by the setting of potentiometer 114 of a comparator circuit 115. Likewise, an acceptable upper limit is programmed by the setting of a potentiometer 116. In addition, a potentiometer 118 is set at a value to control the grinding process. The relay 120 operates to substitute the potentiometer 118 for the potentiometer 114 during the corrective grinding process. The actual value of the first harmonic signal is compared in lower limit and upper limit comparator circuits 122 and 124 respectively. As in the case of the radial composite signal, the radial harmonic signal may give either a level A, B or C indication. The outputs of the lower limit and upper limit comparator circuits 122 and 124 are utilized to drive a grading relay circuit 126 which will energize various marking devices to mark the tire with a code indicative of the value of the first harmonic of the radial force variation signal. For reasons which will hereinafter be explained, the output signals are also fed to the grind comparator circuit 96.

Figure 5:
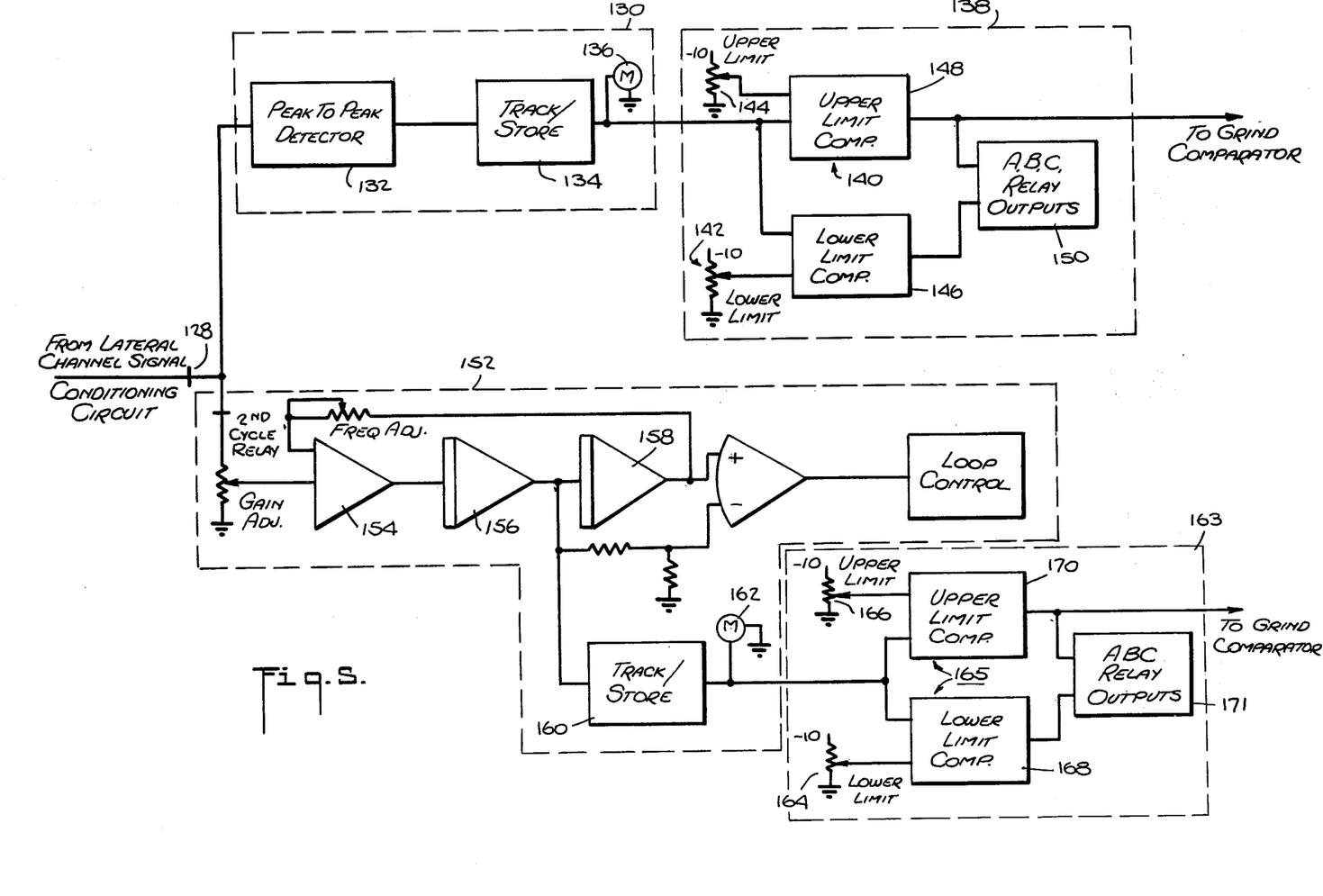
FIG. 5 is an amplified block diagram of the lateral composite and lateral harmonic circuits 62 and 64 of FIG. 1.

As mentioned hereinabove, the lateral channel signal is passed through a lateral channel composite circuit 62 and a lateral channel harmonic circuit 64. With reference to FIG. 5, the output of the lateral channel siganl conditioning circuit 30 is passed through a relay switch 128 to a peak to peak detection circuit 130 wherein the absolute peak to peak value of the signal is determined in a peak to peak detector 132 and, preferably, is stored in a track and store circuit 134. The value may be displayed on a meter 136. The track and store circuit 134 permits the value of the lateral composite force to be updated during the corrective grinding process as hereinafter described.

The output of the peak to peak detection circuit 130 is fed to a classification circuit 138 which includes a comparator circuit 140. An acceptable lower limit of the lateral composite force value is programmed into the system by the setting of a potentiometer 142. Likewise, a signal corresponding to an acceptable upper limit is programmed into the system by the setting of a potentiometer 144. The actual value of the of the lateral composite force signal is then compared in lower limit and upper limit comparator circuits 146 and 148 respectively to determine which classification, i.e., level A, B or C applies. The outputs of the lower limit and upper limit comparator circuits 146 and 148 are utilized to drive a grading relay circuit 150 which will energize various marking devices to mark the tire with a code indicative of the value of the lateral composite of the lateral force variation signal. Also the output of the upper limit comparator 148 is fed to the grind comparator circuit 96 for reasons explained below.

The lateral channel signal is received by the lateral channel harmonic circuit 64 which functions in a manner similar to the radial channel harmonic circuit described above. With continued reference to FIG. 5, the lateral channel harmonic circuit 64 includes a harmonic loop arrangement 152 which contains an amplifier 154 and two integrators 156 and 158. The output of integrator 156 preferably is fed to a track and store circuit 160 so that the value may be updated during the corrective grinding process and the value may be indicated on a meter 162. Just as in the case of lateral composite force signal, an acceptable lower limit of of the first harmonic is programmed into the system by the setting of a potentiometer 164 in the comparator circuit 165. Likewise, a signal corresponding to an acceptable upper limit is programmed into the system by the setting of a potentiometer 166. The actual value of the first harmonic signal is then compared in lower limit and upper limit comparator circuits 168 and 170, respectively to determine which classification, i.e., A, B or C applies. The outputs of the lower limit and upper limit comparator circuits 168 and 170 are utilized to drive a grading relay circuit 171 which will energize various marking devices to mark the tire with a code indicative of the value of the first harmonic of the lateral force variation signal. In addition, the output of the upper limit comparator 170 is fed to the grind comparator circuit 96.

The lateral channel composite and harmonic circuit components with the exception of the track and store circuits are discussed with the radial channel composite and harmonic circuit components in the Manual at the locations cited hereinabove for the latter.

Upon receipt of the output signals from the radial channel composite lower limit and upper limit comparator circuits 92 and 94, the radial channel harmonic lower limit and upper limit comparator circuits 122 and 124, the lateral channel composite upper limit comparator circuit 148 and the lateral channel harmonic upper limit comparator circuit 170, the grind operator circuit 96 makes a grind/no grind decision. Both the grind comparator circuit 96, and the grind control circuit 60 which are well known in the art, are described at pages 3-7 and 3-8 as well as schematically detailed on Sheets 5 and 6 of Drawing DOO 045 0152 OS of the Manual.

Should the grind comparator circuit receive level A indications from all of the above mentioned comparator circuits, the tire is acceptable and no grinding is necessary. Should it receive level C indications from any of the just mentioned comparator circuits, the tire is incorrectable and no corrective grinding is undertaken. Should the grind comparator circuit 96 receive level B indications form the radial channel comparator circuits, a decision to grind is made. A signal is fed to the grind control circuit 60 to initiate the corrective grind process.

Only the lateral channel upper limit comparator circuit outputs are fed to the grind comparator circuit 96 because the present invention does not concern itself specifically with the reduction of lateral force variation. The upper limit comparator circuits are monitored only so that if a level C classification is indicated, no grinding will occur, or grinding, if begun, will stop since the force values have exceeded acceptable limits.

Figures 6, 7:
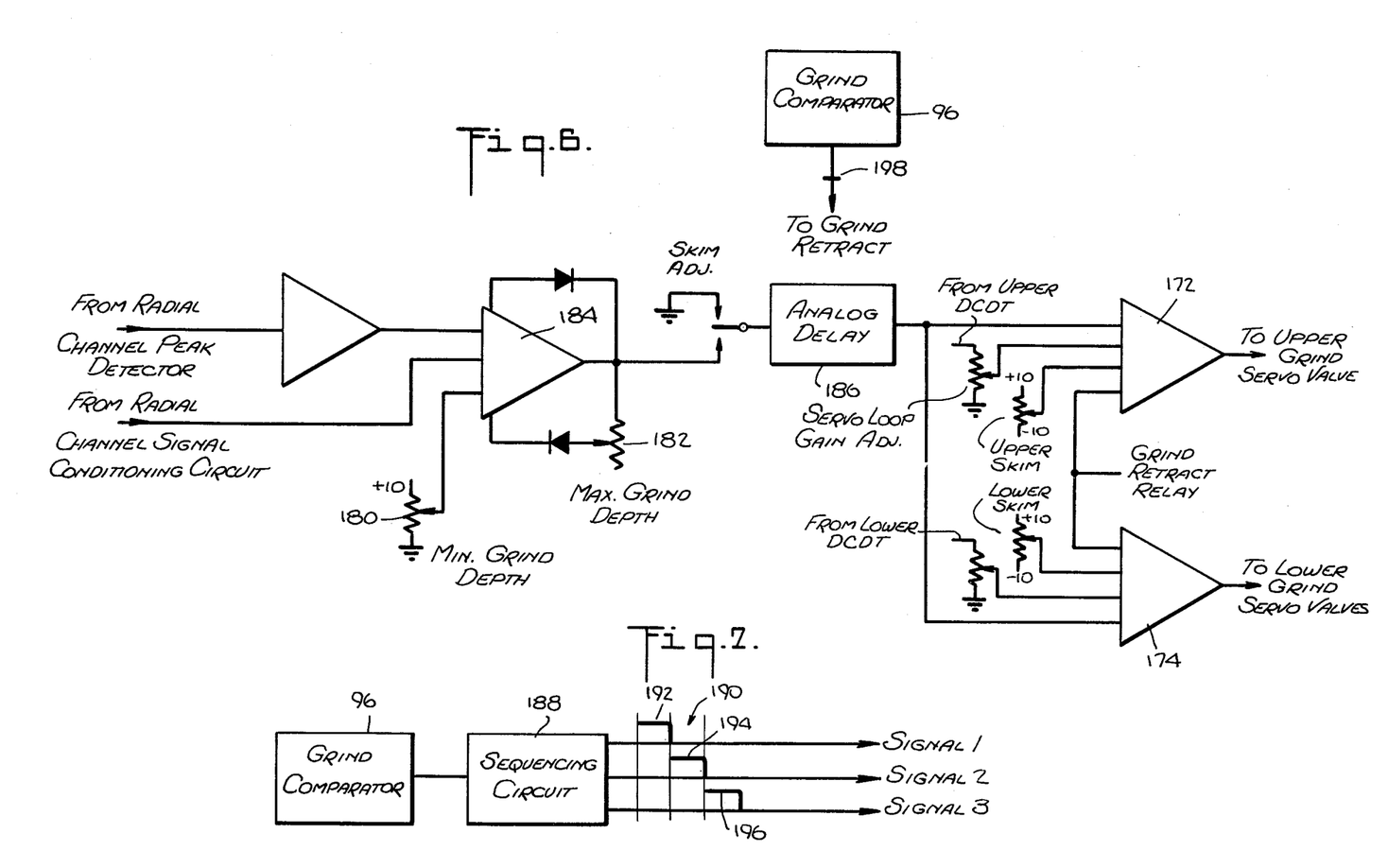
FIG. 6 is an amplified block diagram of the grind control circuit 60 of FIG. 1.
FIG. 7 is a schematic representation of the output of the sequencing circuit 188 of FIG. 1.

The grind control circuit 60 is represented in the block diagram in FIG 6. Briefly, the servo amplifiers 172 and 174 control the selective operation of servo valves (not shown) which position the grinders 176 and/or 178 (FIG. 1) to remove material from the tire thereby adjusting the correctable radial force variation. In addition, two potentiometers 180 and 182 associated with an amplifier 184 which drives the servo amplifier 172 and 174 through the analog delay 186 are used to program the minimum grind level and maximum grind depth respectively.

As mentioned hereinabove upon a grind decision being reached by the grind comparator circuit 96, the relays 90 and 120 operate to open the circuits to potentiometers 84 and 114 respectively, and substitute for these the potentiometers 88 and 118. This permits grinding the tire to values which may be below the original set acceptable lower limits established by the potentiometers 84 and 114.

The grind comparator circuit 96 also emits a signal to a sequencing circuit 188 which operates to control measurement updating procedures during the corrective grinding process. As best seen in FIGS. 1 and 7 the sequencing circuit feeds a periodic digital signal 190 to several of the circuits in the system. A first control signal 192 is sent to the radial and lateral channel peak to peak detectors 70 and, 132, respectively and to the radial and lateral channel harmonic loop circuits 100 and 152 respectively, to clear or reset these circuits. The radial and lateral channel track and store circuits 72, 110, 134 and 160, which are placed in their store mode by the grind comparator circuit 96 once the grind decision was made, remain in such mode. At the end of signal 192, a second control signal 194 is fed to the peak to peak detectors and harmonic loop arrangements. The second control signal 194 stimulates the circuits to receive and operate on their respective incoming radial and lateral channel signals. A third control signal 196 is sent to the track and store circuits 72, 110, 134 and 160, to qualify the circuits to receive the signal corresponding to the newly calculated values prepared by the peak to peak detectors 70 and 132 and the harmonic loop arrangements 100 and 152 during the second control signal 194.

As mentioned hereinabove, the signal 190 is periodic and preferably can repeat every three seconds. The new signals received by the radial channel track and store circuits 72 and 110 are fed to comparator circuits 76 and 102 respectively for comparison with the pre-set radial composite and harmonic grind limits. The resultant signals are fed to the grind comparator circuit 96 for continuous monitoring of the grinding operation. Grinding can be controlled by either the radial composite or radial harmonic force signal, and when grinding has proceeded to the point whereat the variation is below whichever of the radial composite or radial harmonic grind limit controlling the grinding process relay, 198 (FIG. 6) is energized to close a normally open circuit which will retract the grinders from the tire.

The corrective grinding process can also be controlled by a timing circuit (not shown) which will interrupt the grinding process after a preset time limit has been exceeded, even if the lower grind limits have not been met.

The new signals received by the lateral channel track and store circuits 134 and 160 are used to determine the final classification of the tire upon completion of the corrective grinding process.

At the completion of the corrective grinding process, a signal is emitted from the grind comparator circuit 96 to the sequencing circuit 188 to interrupt the control signal 190 which in effect, results in the latest value of the radial composite, radial harmonic, lateral composite and lateral harmonic signals being retained in the track and store circuits 74, 110, 134 and 160 respectively.

When the tire stops revolving in the first direction and begins to revolve in the second direction, all the circuits are reset by known control circuitry which for the sake of brevity is not shown herein, except for the lateral thrust circuit 66 which will now be described.

Figure 8:
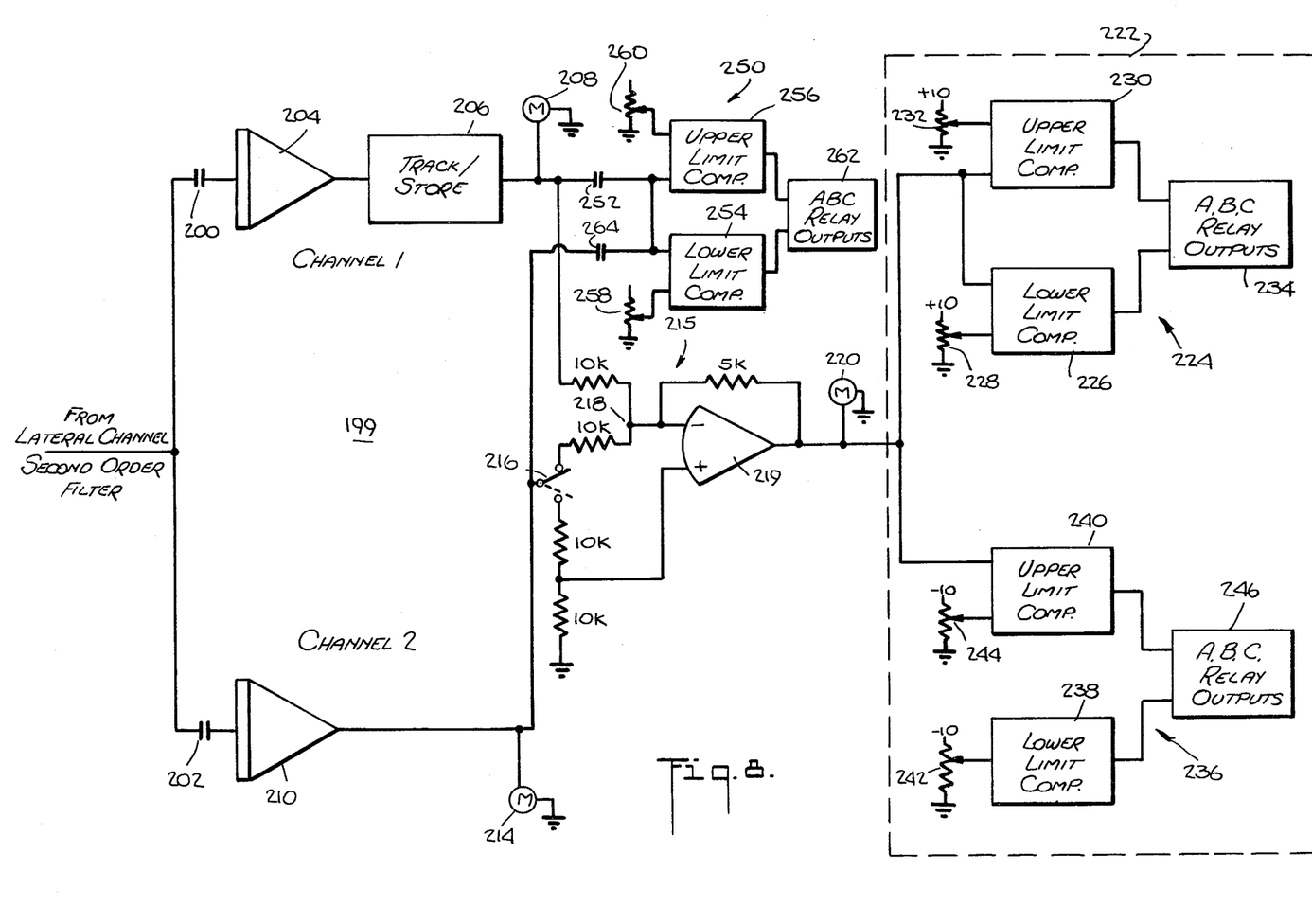
FIG. 8 is an amplified block diagram of the lateral thrust circuit 66 of FIG. 1.

As mentioned hereinabove, the output of the second order filter 42 is also fed to a lateral thrust circuit 66. With reference to FIG. 8 the lateral thrust circuit includes a conicity/ply steer calculation circuit 199 having a pair of direction relays 200 and 202 which operate to control operation of either channel 1 or channel 2. As the tire rotates in a first direction during the test procedure to be described, the relay 200 will close and relay 202 will remain open, so that integrator 204 will receive the incoming force signal. The integrator 204 calculates the average value of the lateral thrust during one revolution of the tire in the first direction. The calculated value is stored in track and store circuit 206 and may be read out on a meter 208 if desired.

If the grind comparator circuit 96 discussed hereinabove reaches a grind decision, the periodic signal 190 from the sequencing circuit is also received by the lateral thrust circuit so that updated force values of the lateral thrust can be obtained. The first control signal 192 operates to clear or reset the integrator 204 but does not affect the tract and store circuit 206 which retains the latest calculated value of the lateral thrust. The second control signal 194 activates the integrator 204 to receive an incoming signal and to calculate the lateral shift based on the new signal, and the third control signal 196 clears the track and store circuit 206 to receive the new or updated lateral thrust force value.

When the tire is revolved in the second direction, the relay 200 opens and relay 202 closes to permit the incoming lateral channel signal to pass to the second integrator 210 for calculation of the lateral thrust force value generated by the tire as it revolves in the second direction. This value is stored in the integrator circuit 210 and may be indicated on a meter 214. The lateral thrust signals stored in circuits 206 and 210 are then fed to a conicity/ply steer calculation circuit 215 which calculates the combined effects of lateral thrust for both directions of tire revolution.

The conicity/ply steer calculation circuit 215 includes a switch 216 which, when placed as shown in solid lines in FIG. 8, permits the values of the lateral thrust signal stored in track and store circuit 206 and integrator circuit 21 to be summed at terminal 218 and both signals are applied to the negative input of amplifier 219. Therefore, the amplifier 219 has an output equaling the algebraic sum of the lateral thrust values in the two directions, divided by two, which is defined as conicity. If the switch 216 is placed in the position shown in phantom lines in FIG. 8, the signal from track and store circuit 206 is applied at the negative input of the amplifier, but the signal from integrator circuit 210 is applied at the positive input so that the amplifier output is equal to the algebraic difference of the two signals divided by two which is defined as the ply steer. The resultant value may be displayed on a meter 220.

A classification circuit 222 is provided to compare the calculated conicity or ply steer input to preselected acceptable lower and upper limits and energize relays to indicate the resultant classification level. Since the conicity and ply steer forces operate in one direction or the other, the force value can be considered either positive if acting in one direction or negative if acting in the opposite direction.

As shown in FIG. 8, a positive conicity and ply steer classification circuit 224 includes a lower limit comparator circuit 226 having a lower limit potentiometer 228 which is pre-set to a desired lower limit value. The circuit also includes an upper limit comparator circuit 230 and its associated upper limit potentiometer 232. If a positive conicity or ply steer value is calculated the signal is analyzed by the positive classification circuit 224. If the value is less than the lower limit, a level A classification is indicated. If the value is between the upper and lower limits, a level B classification is indicated, and if the value is greater than the upper limit, a level C is indicated. The means of indication is through a grading relay circuit 234 similar to those described hereinabove.

A second classification circuit 236 is provided to analyze a negative conicity and ply steer, and includes lower limit and upper limit comparator circuits 238 and 240 having potentiometers 242 and 244 respectively associated therewith. This circuit operates in exactly the same manner as described for the positive classification circuit 224 except that it responds only to negative values of conicity or ply steer. The classification levels may be indicated through a grading relay circuit 246 as shown.

For a detailed analysis of the operation of the integrators 204 and 210, the conicity/ply steer calculation circuit 215 and the classification circuit 222, reference should be had to Supplement 2 of the Manual and Drawings D 00 002 1641 OS and C 00 002 1641 OS appearing therein.

The method for grinding and measuring a tire in accordance with the present invention will now be discussed in detail.

With reference to FIG. 1, the tire 14 is mounted on the rim 12 and is inflated to its rated pressure. The tire is then revolved by the drive means 22 in a first direction which may be either clockwise or counterclockwise. The direction in which the tire is first revolved depends upon the direction in which the tire must revolve in order for the machine 10 to grind, since, in accordance with the method of the present invention, the tire is first revolved in the direction in which corrective grinding to adjust the radial force variation can be undertaken, if necessary. The load wheel 16 is then brought into contact with the tire 14 for mechanically loading the tire. The position of the shaft 20 is adjusted by any suitable known means relative to the tire axle 18 and the spacing between the shaft 20 and axle 18 is kept at a certain distance when a desired load is applied to the tire 14.

The radial and lateral force variations caused by the revolving tire 14 as it rotates in the first direction are sensed by the load cell means 24 and 26 respectively which feed electrical signals to the radial and lateral channel signal conditioning circuits 28 and 30 respectively. The radial channel signal then is fed to the radial channel composite circuit 56 wherein the radial composite force signal is determined or resolved, stored and compared against pre-set limits for classification purposes. The radial channel harmonic circuit 58 determines or resolves the radial harmonic force value and stores that value and compares it to pre-set limits for classification of the tire.

Concurrently, the lateral channel signal is resolved into the lateral composite force value, stored and compared with pre-set limits for classification of the tire in the lateral channel composite circuit 62. The lateral harmonic force value is also resolved, stored and compared against pre-set limits for tire classification in the lateral channel harmonic circuit 64. The lateral thrust circuit 66 resolves and stores the lateral thrust force value.

An analysis of the values of the radial composite and radial harmonic force values is made to determine if radial force variation correction is necessary or possible. The lateral composite and lateral harmonic values are analyzed to determine if these values are below acceptable maximums. If the lateral force values are acceptable, and if the radial force variation is correctable, corrective grinding is initiated by a grind comparator circuit 96 and a sequencing clock 188 generates signals to permit updated values of the radial composite, radial harmonic, lateral composite, lateral harmonic and lateral thrust forces to be determined and stored. Upon completion of the corrective grinding process, the values stored in the radial composite, radial harmonic, lateral composite and lateral harmonic circuits are used for updated classification and then erased. The lateral thrust value, which is the latest, post corrective grind value, is retained. Alternatively, after the corrective grinding process, the tire may continue to revolve in the first direction so that the force values can be updated, but only the lateral thrust force value is retained, the others being erased.

The tire is then stopped and revolved under load in the second direction and the radial composite, radial harmonic, lateral composite, lateral harmonic and lateral thrust values are determined from the radial channel signal and lateral channel signal respectively. The lateral thrust value is stored and combined with the lateral thrust value resolved as the tire rotated in the first direction to calculate conicity or ply steer, which resultant value is then compared along with the radial composite, radial harmonic, lateral composite and lateral harmonic force values with pre-selected limits to determine, further, the tire classification.

Additional classification can be conducted by analysis of one or both of the lateral thrust force values. As shown in FIG. 8, the updated signal stored in the track and store circuit 206 can be fed to a comparator circuit 250 through a relay 252. The comparator circuit 250 includes a lower limit comparator 254 and an upper limit comparator 256. The system is programmed by the setting of a potentiometer 258 associated with the lower limit comparator 254 and a potentiometer 260 associated with the upper limit comparator. The lower and upper limit comparators 254 and 256 analyze the lateral thrust force signal and determine which classification level, i.e., A, B or C applies. A grading relay circuit 262 marks the tire accordingly.

The relay 252 operates during the test cycle to permit the updated lateral thrust force signal determined as the tire revolves in a first direction to be fed to the comparator circuit 250. When the tire revolves in the second direction with relay 264 operates to place the integrator 210 in circuit with the comparator circuit 250 so that the lateral thrust force value determined as the tire revolves in the second direction can also be used to classify the tire.

Accordingly the method hereinabove detailed may include the additional steps of classifying the tire according to one or both of the lateral thrust force values.

From the foregoing, it will be apparent to those skilled in the art that there are disclosed herein a new and useful method and apparatus for operating tire grinding machines which are effective to accurately classify a tire by using only post grinding values of the measured forces.

The invention disclosed will have many modifications which will be apparent to those skilled in the art in view of the teachings of this specification. It is intended that all modifications which fall within the true spirit and scope of this invention be included within the scope of the appended claims.

What is claimed is:
1. A method of optimizing the uniformity of a tire comprising the steps of:
 (a) revolving said tire in contact with a load wheel in a first direction;
 (b) determining the radial composite force value and the lateral force value between said tire and said load wheel;
 (c) determining a harmonic of said radial composite force value and said lateral composite force value;
 (d) determining a lateral thrust force reaction between said tire and said load wheel;
 (e) grinding said tire until said radial composite force value lies within predetermined limits;
 (f) updating the values of said radial composite, radial harmonic, lateral composite, lateral harmonic and lateral thrust force values to provide post-grinding values;
 (g) classifying said tire in accordance with said updated post-grinding values of the radial composite, radial harmonic, lateral composite and lateral harmonic forces;
 (h) storing the value of the updated lateral thrust force value;
 (i) revolving said tire in a second direction in contact with said load wheel;
 (j) determining the radial composite, radial harmonic, lateral composite, lateral harmonic and lateral thrust force values as said tire rotates in said second direction;
 (k) combining said lateral thrust force value determined and stored as said tire revolved in said first direction after grinding with said lateral thrust force value determined as said tire revolved in said second direction to calculate the conicity of said tire; and
 (l) classifying said tire in accordance with said conicity value and said radial composite, radial harmonic, lateral composite and lateral harmonic force values determined as said tire revolved in said second direction.

2. The method according to claim 1 further including the step of storing said updated value of said lateral composite force value during grinding.

3. The method according to claim 1 wherein said harmonics are the first harmonics of said radial composite force and said lateral composite force respectively.

4. The method according to claim 1 wherein said updating occurs during said grinding.

5. The method according to claim 1 wherein said updating occurs after said grinding is completed.

6. An improved tire grinding machine and control system therefor comprising:
 (a) means rotatably supporting a tire for revolution about its axis selectively in a first and a second direction;
 (b) load wheel means adapted to engage said tire as it revolves to apply a load thereto;
 (c) means for generating electrical signals representative of the radial and lateral force variations between said tire and said load wheel as said tire revolves in said first and second directions;
 (d) means for resolving said radial force variation signal into a radial composite force value and a radial harmonic force value;
 (e) means for resolving said lateral force variation signal into a lateral composite force value, a lateral harmonic force value and a lateral thrust force value;

(f) means for grinding said tire as it rotates in said first direction until said radial composite force value lies within predetermined limits;

(g) means for updating the value of said radial composite, radial harmonic, lateral composite, lateral harmonic and lateral thrust force values as said tire revolves in said first direction to obtain post-grinding force values;

(h) means for storing said updated, lateral thrust force value during rotation of said tire in a second direction;

(i) means for combining said stored lateral thrust force value determined as said tire revolved in said first direction with said lateral thrust force value determined as said tire revolved in said second direction to calculate the conicity of said tire; and (j) classification means adapted to indicate the classification of said tire in accordance with the updated, post-grinding value of said radial composite, radial harmonic, lateral composite and lateral harmonic force values determined as said tire revolved in said first direction, said radial composite, radial harmonic, lateral composite and lateral harmonic force values determined as said tire revolved in said second direction, and said conicity value.

7. The improved tire grinding machine and control system therefor according to claim 6 further including means for storing the updated post-grinding value of said lateral composite force signal.

8. A method of optimizing the uniformity of a tire comprising the steps of:

(a) revolving said tire in contact with a load wheel in a first direction;

(b) determining the radial composite force value and the lateral composite force value between said tire and said load wheel;

(c) determining a harmonic of said radial composite force value and said lateral composite force value;

(d) determining a lateral thrust force reaction between said tire and said load wheel;

(e) grinding said tire until said radial composite force value lies within predetermined limits;

(f) updating the values of said radial composite, radial harmonic, lateral composite, lateral harmonic and lateral thrust force values to provide post-grinding values;

(g) classifying said tire in accordance with said updated post-grinding values of the radial composite, radial harmonic, lateral composite and lateral harmonic forces;

(h) storing the value of the updated lateral thrust force value;

(i) revolving said tire in a second direction in contact with said load wheel;

(j) determining the radial composite, radial harmonic, lateral composite, lateral harmonic and lateral thrust force values as said tire rotates in said second direction;

(k) combining said lateral thrust force value determined and stored as said tire revolved in said first direction after grinding with said lateral thrust force value determined as said tire revolved in said second direction to calculate the ply steer of said tire; and (l) classifying said tire in accordance with said ply steer value and said radial composite, radial harmonic, lateral composite and lateral harmonic force values determined as said tire revolved in said second direction.

* * * * *

UNITED STATES PATENT AND TRADEMARK OFFICE
CERTIFICATE OF CORRECTION

PATENT NO. : 4,095,374
DATED : June 20, 1978
INVENTOR(S) : John W. Ugo

It is certified that error appears in the above-identified patent and that said Letters Patent are hereby corrected as shown below:

In column 14, line 7, after "lateral" and before "force," insert --composite--.

Signed and Sealed this

Seventeenth Day of July 1979

[SEAL]

Attest:

LUTRELLE F. PARKER
*Attesting Officer*   *Acting Commissioner of Patents and Trademarks*